United States Patent
Risbo Jeppesen

(10) Patent No.: US 8,284,028 B2
(45) Date of Patent: Oct. 9, 2012

(54) METHOD OF MANUFACTURING AN IDENTIFIABLE ROOFING PRODUCT INCLUDING A ROOFING PRODUCT AND A PROCESS PLANT FOR CARRYING OUT THE METHOD

(75) Inventor: Henrik Risbo Jeppesen, Farum (DK)

(73) Assignee: Icopal Danmark A/S, Herlev (DK)

( * ) Notice: Subject to any disclaimer, the term of this patent is extended or adjusted under 35 U.S.C. 154(b) by 862 days.

(21) Appl. No.: 12/191,789

(22) Filed: Aug. 14, 2008

(65) Prior Publication Data

US 2010/0039226 A1 Feb. 18, 2010

(51) Int. Cl.
 *H04Q 5/22* (2006.01)
(52) U.S. Cl. .................. 340/10.1; 340/10.4; 340/10.41; 340/10.42; 340/572.1; 156/60
(58) Field of Classification Search .................. 340/10.1, 340/10.4, 10.41, 10.42, 572.1; 156/60
See application file for complete search history.

(56) References Cited

U.S. PATENT DOCUMENTS

| | | | |
|---|---|---|---|
| 179,130 A | | 4/1921 | Marks et al. |
| 1,551,318 A | | 3/1922 | Logan |
| 2,729,574 A | * | 1/1956 | Schwarz ................ 428/206 |
| 4,032,355 A | * | 6/1977 | McLaughlin et al. ..... 106/284.4 |
| 4,035,544 A | * | 7/1977 | Iwasaki et al. ................ 442/63 |
| 4,039,706 A | * | 8/1977 | Tajima et al. ................ 428/40.3 |
| 4,055,453 A | * | 10/1977 | Tajima et al. ................ 156/279 |
| 4,065,899 A | * | 1/1978 | Kirkhuff ................ 52/309.8 |
| 4,091,135 A | * | 5/1978 | Tajima et al. ................ 428/40.3 |
| 4,107,375 A | * | 8/1978 | Iwasaki et al. .................. 442/67 |
| 4,270,382 A | * | 6/1981 | Kamman ................ 73/37.5 |
| 4,567,080 A | * | 1/1986 | Korsgaard ................ 428/137 |
| 4,636,414 A | * | 1/1987 | Tajima et al. ................ 428/40.3 |
| 4,700,976 A | * | 10/1987 | Loose ................ 283/101 |
| 5,100,939 A | * | 3/1992 | Vitkuske et al. ................ 524/68 |
| 5,342,461 A | * | 8/1994 | Murphy ................ 156/64 |
| 5,437,735 A | * | 8/1995 | Younan et al. ................ 136/251 |
| 5,456,785 A | * | 10/1995 | Venable ................ 156/229 |
| 5,843,252 A | * | 12/1998 | Murphy ................ 156/64 |
| 5,853,530 A | * | 12/1998 | Allen ................ 156/541 |
| 5,932,287 A | * | 8/1999 | Michelsen et al. ................ 427/315 |
| 5,951,809 A | | 9/1999 | Jenkins et al. |
| 6,296,912 B1 | * | 10/2001 | Zickell ................ 428/40.1 |
| 6,355,309 B1 | * | 3/2002 | Fleming et al. ................ 427/461 |

(Continued)

FOREIGN PATENT DOCUMENTS

GB 179130 4/1921

(Continued)

OTHER PUBLICATIONS

Anonymous, Apr. 2005, Radio frequency identification technology (RFID) for building materials, database 492028.*

(Continued)

*Primary Examiner* — Benjamin C Lee
*Assistant Examiner* — Quang D Pham
(74) *Attorney, Agent, or Firm* — Brinks Hofer Gilson & Lione

(57) ABSTRACT

A method of manufacturing an identifiable roof covering incl. the product thereof, comprising the steps of providing a first layer of material, providing a second layer of material onto said first layer of material and arranging a RFID tag onto the first layer of material prior to providing the second layer of material.

17 Claims, 1 Drawing Sheet

U.S. PATENT DOCUMENTS

| | | | |
|---|---|---|---|
| 6,419,782 B1* | 7/2002 | Johnson et al. | 156/277 |
| 6,426,309 B1* | 7/2002 | Miller et al. | 442/148 |
| 6,531,200 B2* | 3/2003 | Zickell et al. | 428/40.1 |
| 7,148,273 B2* | 12/2006 | de Jong et al. | 524/59 |
| 7,776,177 B2* | 8/2010 | Hubbard | 156/300 |
| 7,804,406 B2* | 9/2010 | Kaga et al. | 340/572.1 |
| 7,911,344 B2* | 3/2011 | August et al. | 340/572.1 |
| 7,946,496 B2* | 5/2011 | Ford et al. | 235/487 |
| 8,149,121 B2* | 4/2012 | Kaga et al. | 340/572.1 |
| 2002/0160151 A1* | 10/2002 | Pinault et al. | 428/144 |
| 2003/0068469 A1* | 4/2003 | Aschenbeck et al. | 428/150 |
| 2003/0122655 A1* | 7/2003 | Hum et al. | 340/10.3 |
| 2003/0230040 A1* | 12/2003 | Shirota | 52/302.1 |
| 2004/0046663 A1* | 3/2004 | Jesser | 340/572.1 |
| 2004/0085190 A1* | 5/2004 | Tuttle et al. | 340/10.1 |
| 2004/0195761 A1* | 10/2004 | Blumle | 271/276 |
| 2005/0167024 A1* | 8/2005 | Sanzone et al. | 156/64 |
| 2005/0178430 A1* | 8/2005 | McCaskill et al. | 136/251 |
| 2005/0205202 A1* | 9/2005 | Chaoui et al. | 156/269 |
| 2005/0257875 A1* | 11/2005 | Khan et al. | 156/60 |
| 2006/0065998 A1* | 3/2006 | Takigawa | 264/132 |
| 2006/0070700 A1* | 4/2006 | Cone | 156/249 |
| 2006/0096218 A1* | 5/2006 | Johnson | 52/506.01 |
| 2006/0125640 A1 | 6/2006 | Oakes et al. | |
| 2006/0157202 A1* | 7/2006 | Arippol | 156/539 |
| 2006/0185781 A1* | 8/2006 | McLaughlin | 156/64 |
| 2006/0237125 A1* | 10/2006 | Montgomery et al. | 156/249 |
| 2007/0026195 A1* | 2/2007 | Pinault et al. | 428/141 |
| 2007/0054576 A1* | 3/2007 | Kalkanoglu et al. | 442/59 |
| 2007/0096880 A1* | 5/2007 | Nagai | 340/10.41 |
| 2007/0187017 A1* | 8/2007 | Hubbard | 156/60 |
| 2007/0256788 A1* | 11/2007 | Ford et al. | 156/358 |
| 2007/0257798 A1* | 11/2007 | Ford et al. | 340/572.1 |
| 2008/0048838 A1* | 2/2008 | Montgomery et al. | 340/10.51 |
| 2008/0115444 A1* | 5/2008 | Kalkanoglu et al. | 52/518 |
| 2008/0248241 A1* | 10/2008 | Kalkanoglu et al. | 428/141 |
| 2008/0248244 A1* | 10/2008 | Kalkanoglu et al. | 428/143 |
| 2009/0022924 A1* | 1/2009 | Griffin | 428/40.2 |
| 2009/0064628 A1* | 3/2009 | Mellott et al. | 52/717.05 |
| 2009/0241450 A1* | 10/2009 | Italiane et al. | 52/309.3 |
| 2010/0033297 A1* | 2/2010 | Patovirta | 340/5.1 |
| 2010/0090089 A1* | 4/2010 | Koegel | 249/189 |
| 2010/0176189 A1* | 7/2010 | Gray et al. | 235/375 |
| 2010/0192509 A1* | 8/2010 | Sieling et al. | 52/741.3 |
| 2010/0218876 A1* | 9/2010 | Mellott et al. | 156/60 |

FOREIGN PATENT DOCUMENTS

WO     WO 2008034948 A1 *   3/2008

OTHER PUBLICATIONS

Anonymous: Research Disclosure, vol. 492, No. 020, Apr. 10, 2005, XP002512299 Emsworth, GB.
European Search Report for European Patent Application No. EP08162158 dated Jan. 28, 2009.
PCT International Search Report for PCT Application No. PCT/EP2009/060005 dated Oct. 22, 2009.
*Icopals usynlige chip sladrer om tyveri*, Dec. 11, 2007, www.building-supply.dk/article/view.html?id=19152.
*Flydende asfalt kan spores*, published spring 2008, *Borsen* (Danish newspaper).
*Vind Garmin GPS*, Apr. 1, 2008, *FRA Icopal*.
*RFID-tag i tagpap*; May 28, 2008, www.ue.dk/nyhedsarkiv/21598.aspx.

* cited by examiner

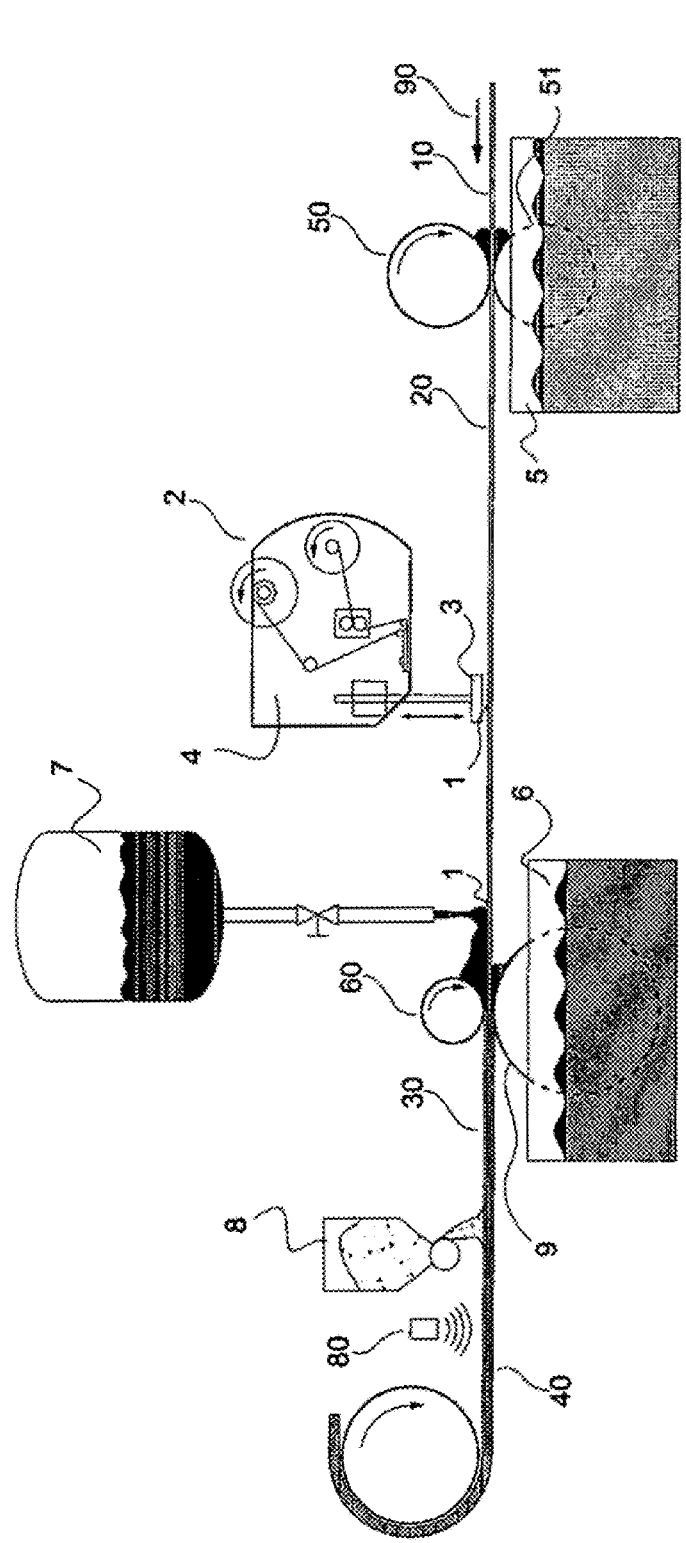
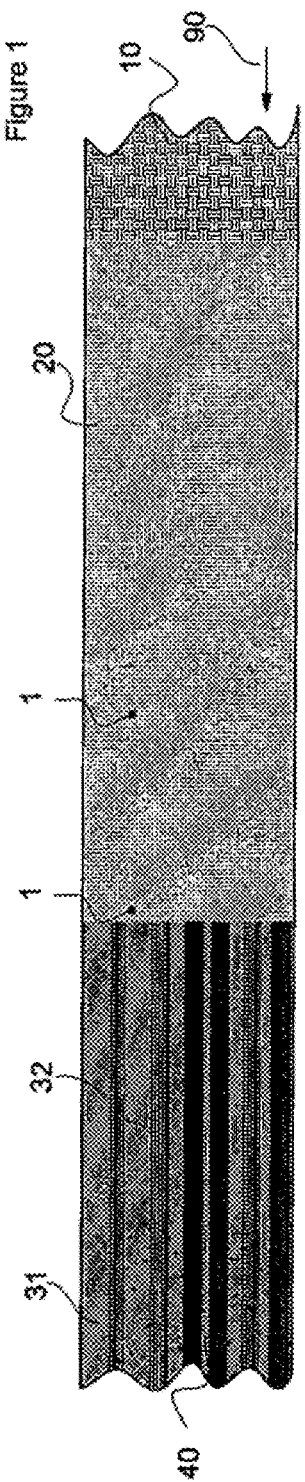

METHOD OF MANUFACTURING AN IDENTIFIABLE ROOFING PRODUCT INCLUDING A ROOFING PRODUCT AND A PROCESS PLANT FOR CARRYING OUT THE METHOD

The present invention relates, according to a first aspect, to a method of manufacturing an identifiable roofing product wherein the roofing product is provided with one or more devices being able to communicate with a read and/or write apparatus by means of radio waves.

According to the first aspect, the present invention relates to a method of manufacturing an identifiable roofing product comprising the steps of:
providing a first layer of material,
providing a second layer of material onto the first layer of material, and
arranging least one device adapted to communicate via radio waves onto the first layer of material prior to providing the second layer of material.

According to a second aspect, the present invention relates to process plant adapted to carrying out the invention according to the first aspect.

According to a third aspect, the present invention relates to a method of identifying a roof where the roof is manufactured according to the first aspect.

According to a fourth aspect, the present invention relates to an identifiable roofing product consisting of a first layer of material, a second layer of material wherein at least one device adapted to communicate via radio waves is arranged in between the first layer of material and the second layer of material.

The terms "roof" or "roofing", which is employed throughout this specification, applies not solely to the external face of a building.

The terms "roof" or "roofing" shall in this specification be understood as terms identifying a roof as such incl. a space below an outer and weather exposed roof covering, such as an attic an the like, such as moisture or vapour barriers.

BACKGROUND

Roofing products such as asphalt or bitumen impregnated roof coverings and vapour barriers and the like are today difficult to identify upon the product being dispatched from its place of manufacture.

Manufacturers of such roofing materials have a strong desire in obtaining a simple and cost effective method of applying a unique, reliable and durable identification to their products. Further, manufacturers of the above roof products strive in producing a product comprising an identification system being able to encompass close to an infinite number of identities in order to provide the product with a unique ID being able to hold a precise date, time and location of manufacture.

There are various reasons for such desire, some of which are:
possibility for determining whether a product is actually manufactured by a particular manufacturer in order to prevent and unveil imitations,
possibility for optimization of internal logistic and handling,
possibility for identifying stolen products, and
possibility for tracing the product back to an exact place and time of manufacture.

Up to this day, roofing products like roll roofing and roofing shingles comprising a bitumen impregnated core provided with at least one further layer of bitumen are either not marked with identification or marked with a simple physical identification "stamp" between the layers or directly on one of its surfaces. Such marking typically consist of a combination of characters constituting an ID of the product.

The marking is typically performed by means of an impression, e.g. from a stamp or a roll arranged in connection with a production line, where the stamp or roll comprises a set of characters which is impressed into the roofing product.

Another common way of identifying a product is by means of an inked stamp applied on the product or on the outer surface of the finished roll of roofing product.

The above techniques hold several drawbacks, some of which are:
difficulties in providing fast changing identifications as the means for impressing into the roofing product typically constitutes fixed characters which are not easily changeable,
difficulties in locating the impressions on the final product,
poor quality of the impressions as the material of the roofing product tends to stick to the means for impression,
poor durability due the nature of the asphalt or bitumen based material, as the material, even after application to a roofing structure, holds a degree of indulgence, the impressions over time is smoothed out, and
imitations of the product incl. identification may be produced relatively easy, as a somewhat exact copy of a stamp is easy obtainable.

Summative, manufacturers of roofing products wherein the products constitutes layered products like vapour barriers and roof coverings, strive in obtaining a feasible method of manufacturing aforementioned products.

One example of a layered vapour barrier is disclosed in the U.S. Pat. No. 4,567,080 A, which teach a vapour barrier comprising two vapour-tight layers and a water absorbing layer interposed there between.

One example of a layered roof covering is disclosed in GB 2094226 A, which teach a sealing sheet with an upper layer, a strengthening layer and an underside layer. The sheet is used for covering parts of buildings and roofs.

The art includes a number of methods of identifying roofing products, one example is GB 179130 A which suggests identifying the time and place of origin of roofing product by means of a thread embedded within or in between layers constituting the product. The colour of the thread is linked to a particular place of manufacture, whereby the origin of the product may be determined.

The possible variants of the above identification technique is limited to the number of colours available for the thread, and further, information like production date and exact time of production are not immediately applicable.

Today there are more advanced methods of identification available. One of particular interest to manufacturers of roof coverings is the radio frequency identification technique, generally called RFID and described e.g. in U.S. Pat. No. 4,384,288A.

The RFID technique relies on remotely storing and retrieving data using devices called RFID tags or RFID transponders.

An RFID tag is an object that can be applied to or incorporated into a product for the purpose of identification by means of radio waves. Some tags can communicate over several meters and beyond the line of sight of the reading and/or writing instrument.

RFID tags contain at least two parts. The first part is an integrated circuit for storing and processing information, modulating and demodulating a signal and other specialized functions, and the second part is an antenna for receiving and transmitting the signal.

The parts are typically arranged on a base e.g. constituting a piece of foil or a plastic sheet. The tags are in some embodiments sealed by means of a layer of protective foil applied to the surface opposite the base.

RFID tags come in three general varieties: passive, active, or semi-passive.

Passive tags require no internal power source, thus being pure passive devices (they are only active when a reader is nearby to power them via radio waves), whereas semi-passive and active tags require a power source, usually a small battery.

As the passive RFID tags have no internal power supply, the minute electrical current induced in the antenna by the incoming radio frequency signal, is used as power for the electronic circuits in the tag.

A drawback of many of the present RFID tags is that they need an external antenna which is about 80 times larger than the integrated circuit served by the antenna.

As RFID tags today are produced in substantial numbers, the tag by tag cost is typically very low in comparison with the product to which they are applied.

RFID tags may be obtained from various suppliers and in virtually any form, e.g. as a thin "endless" strip from where the tags may be cut one by one.

Another popular way of obtaining a plurality of tags is as thin stickers adhered to a carrying strip. In such embodiments, one surface of the tags is provided with a suitable adhesive.

The RFID tags allows read and write of data which at convenience may constitute place, date and time of production, serial number, manufacturer name and product number etc. The RFID tags even allow for multi-bit encryption and password protection of the data written to the chip.

Manufacturers of roofing products such as vapour barriers and asphalt or bitumen based roofing products, e.g. in the form of roll roofing or roofing shingles, has been seeking methods of manufacture wherein the products are provided with RFID tags, and until now, no feasible method of large scale production has been found.

As the RFID tag, in order to be substantially invisible, and the overall appearance and functionality of final product incl. RFID tag must be equivalent to the overall appearance product without the RFID tag, the tag has to be arranged within the roofing product. As a result of this, the RFID tag must be applied during the manufacturing process, and preferably in between layers constituting the product.

Research and attempts in setting up manufacturing processes of roofing products wherein RFID tags are applied have led to various defects within either the RFID tag or the final product as such. Some of the experienced deficiencies are:
- de-lamination of the roofing product in the area of the RFID tag due to the tag changing form from flat to curved as a result of the tag being subjected to the relatively hot manufacturing process,
- damage to the RFID tag as a result of the tag being exposed to the harsh environment within the manufacturing process.

The first object of the present invention is to therefore set forth a method of manufacture in accordance with the introductory part of this specification and wherein the above problems are overcome.

The second object of the present invention is to provide a process plant adapted to manufacturing a roofing product according to the first aspect of the present invention.

The third object of the present invention is to provide a method of identifying a roof where the roofing product is manufactured according the first aspect of the present invention.

The fourth object is the present invention is to provide an identifiable roofing product consisting of a first layer of material, a second layer of material wherein at least one device adapted to communicate via radio waves is arranged in between the first layer of material and the second layer of material.

BRIEF DESCRIPTION OF THE FIGURES

FIG. 1 is a diagrammatic illustration of the manufacture of the roofing product according to the present invention.

FIG. 2 is a schematically top view of the roofing product under the manufacture according to FIG. 1.

DETAILED DESCRIPTION WITH REFERENCE TO THE FIGURES

Teachings and steps necessary in order to produce a roofing product, which is not described within this specification, are considered basic knowledge for persons skilled in the art and are left out of the below exposition.

The below exposition is dedicated a manufacturing process etc. of a length of roof covering constituting a bituminous roofing membrane.

According to another not illustrated embodiment of the present invention, the invention relates to a manufacturing process of a roofing product not constituting a bituminous membrane, such as a vapour barrier to be arranged between an attic and an underlying rooms or in-between horizontal divisions of a building.

The roofing product is, according to FIGS. 1 and 2, built up and conveyed from left to right as indicated by the arrow 90.

A base 10 constituting a web e.g. of polyester, metal or glass fibre, is conveyed to an impregnating station 5, 50, 51. The impregnating station 5, 50, 51 impregnates the base 10 by means of two opposed rolls 50, 51, wherein according to the illustrated embodiment, the lower roll 51 is partially immersed in a bath 5 of material, e.g. liquid bitumen. As the material is typically non liquid at natural ambient temperatures, the bath 5 may be heated in order to keep the material fluid and applicable to the web by means of the lower roll 51.

The bitumen applied at the impregnating station 5, 50, 51 may constitute substantially pure bitumen, a bitumen/polymer composition or equivalent.

The impregnated web leaves the impregnation station as a sub-product 20.

The temperature of the sub-product 20 after leaving the impregnating station is typically in the range of 125-150° C.

The impregnated sub-product 20 is conveyed to a tagging station 2 where a tag 1, e.g. a device adapted to communicate via radio waves, is applied onto the hot surface of the sub-product 20 by means of a tag applicator 4.

The applicator 4 may constitute a tamp-blow applicator comprising an applying head 3 which is adapted to carry the tag 1 to a position near the surface of the sub-product 20 from where the tag 1 is blown onto the surface of the sub-product 20.

Applying a tamp-blow applicator rather than a conventional tag applicator is beneficial to the process of manufacture according the present invention as the applying head 3 of the tamp-blow applicator 2 never contacts the hot and sticky surface of the sub-product 20. The tamp-blow applicator is adapted to move the applying head 3 close to the surface of the sub-product 20 and blow the tag 1, by means of pressurised air, onto the surface of the sub-product 20.

The pressurised air may advantageously be dried whereby the tag 1 is not subjected to moist.

The applicator 4 applies tags 1 to the surface of the sub-product 20 at controlled intervals, whereby an even and longitudinal distance between the tags 1 is obtained. The longitudinal distance may be selected at convenience; however it has been found that a longitudinal distance of abt. 1 meter between the tags 1 will be suitable for most applications.

According to one embodiment, the tags 1 are encoded within the tagging station 2, by means (not shown) adapted to communicate with the tags 1, such that the tags 1 are, prior to being placed onto the surface of the sub-product 20, encoded with data like identification of production line, make, order no., serial number, date and time and the like.

It will be possible to control the distance between the tags 1 such that the distance is not uniform. This may be due to special requirements and custom orders and the like.

The tamp blow applicator 4 may comprise means (not shown) for sensing the distance between the sub-product 20 and the applying head 3 in order to control the blow out of the tag 1. The means may be adapted to compensate for vertical movement and/or vibrations of the sub-product 20.

Some applicators, which contacts the surface of a product to be tagged or labelled, has been found problematic in applications according to the present invention as the hot and to a certain degree liquid material tends to stick to the means of application whereby the process of application is disrupted.

The applicator 4 may be provided to the process of manufacture as a complete unit comprising a first spool accommodating a strip wherein the tags 1 prepared for application is arranged. The applicator 4 may further comprise a second spool adapted for receiving the empty strip.

The tag 1 may, on a surface facing the sub-product 20, advantageously be provided with an adhesive which, despite the sub-product 20 being somewhat fluent as a result of the increased temperature, improve the tags 1 adherence to the sub-product 20.

One type of tag which has been found less suitable for the application according to the present invention is a type which is arranged on a base constituting a first large surface having a different thermal coefficient of expansion than the components of the tag, i.e. the antenna, which constitutes the second large surface of the tag.

Subjecting abovementioned tags to high temperatures may render the tag deform, which may, in the application according to the present invention, render the final product corrupted. Conversely, should a manufacturer of roofing products request physical marks identifying the location of a tag, this effect may of course be used for the benefit of the manufacturer.

In order to prevent the abovementioned deformation of the tag, it has been found that providing the tag with, on its two large surfaces, a covering of a material having substantially corresponding thermal coefficients of expansion. This will to a great extend eliminate the deformation due to stress caused by heat.

In another embodiment of the present invention, the tags may constitute an "endless" strip accommodating the tags and being arranged on the sub-product 20 as one long strip. Further, the strip accommodating the tags, which may or may not be arranged on both sides of the tag, may constitute a film being able to diffuse into the bitumen.

In embodiments wherein the tags are applied to the sub-product 20 in the form of an endless strip (or tape), the strip is applied by means of a strip applicator.

According to FIG. 1, the applicator 4 is arranged in a position following the impregnating station 5, 50. The illustrated location is however not essential to method according to the present invention. The applicator 4 may equally apply tags directly on an unimpregnated web 10 or, as an alternative, on a layer of material which is not being built-up from a web.

Following the tag application, the sub-product 20 incl. the applied tag 1, reaches a coating station 6, 7, 9, 60, wherein at least one layer of material, e.g. or bitumen, is applied. The upper face of the sub-product 20 may be covered with material applied to the process by means of pouring or spraying material stemming from a tank 7 or equivalent, and the lower face of the sub-product 20 is covered with material conveyed to the surface by means of a lower roll 9 partially submerged in material within the bath 6.

The bitumen applied at the coating station 6, 7, 9, 60 may constitute pure bitumen, a bitumen/polyester composition or equivalent, and further, the applied bitumen is not necessarily equivalent to the bitumen applied under the abovementioned impregnating station 5, 50, 51.

As the material is typically non liquid at natural ambient temperatures, the material may be heated in order to keep the material fluid and applicable to the sub-product 20.

The sub-product 20 leaves the coating station 6, 7, 9, 60 as the product 30.

The rolls 9, 60 may constitute calender rolls adapted to exert pressure in opposition to each other through the layers forming the product 30. The purpose of calendering, or levelling, is to smooth out the product 30 and ensure a substantial uniform distribution of the material applied to the sub-product 20 incl. tag 1 within the coating station 6, 7, 9, 60.

As can be seen in the figure, the tag 1 is, together with the sub-product 20, conveyed through calendering station.

Tests has shown that, as the material applied to the upper surface of the sub-product 20 is somewhat liquid during the step of calendering, the tag 1 incl. it's rather delicate parts, is able to withstand the stress induced by the rolls 9, 60.

The temperature of the sub-product 30 is immediately after the coating station 6, 7, 9, 60 in the range of 170-190° C.

Although not shown within the figures, the manufacturing process may encompass successive steps of coating and/or calendering, however these successive steps are considered optional and irrelevant in respect to the present invention.

The product may, following the coating station, be provided with a layer of slate or equivalent by means of an applicator 8.

A read and/or write station 80 may, according to a preferred embodiment, be arranged at a position following the tag application. The station constitutes a device adapted to communicate with the embedded tag 1. The communication may consist of a test of responsiveness of the embedded tag 1.

As an alternative, the station 80 may demonstrate equivalent encoding functions to that of the applicator 4, or again as an alternative, the read/write station may be adapted to execute kill commands rendering the tag 1 completely disabled.

As the product 30 is conveyed to the applicator 8 at an increased temperature, the slate or equivalent is retained to the surface of the product by means of partially immersion.

As an alternative option, following the application of slate or equivalent, the product may again be subject to another step of calendering in order to depress the slate or equivalent into the surface of the product.

The final product 40 incl. tag 1 is the cut into selected lengths and rolled into rolls.

FIG. 2 is a top view of a part of a roof covering illustrated during manufacture according to the present invention. As can be seen in the figure, the web 10 is initially impregnated, and upon impregnation, forms a sub-product 20 onto which tags 1 are applied. The sub-product 20 incl. tags 1 are then coated wherby another product 32 is formed.

Numeral 32 on FIG. 2 refers to a butt region of a roof covering, and numeral 40 refers to a tab region of the roof covering. The butt region 31 constitutes a portion prepared for overlapping by a tab region of a roof covering arranged in parallel on a roofing structure. The overlap is typically sealed by means of a welding torch considerably increasing the temperature of the region, which is why the tag 1 should not be arranged within this particular area.

As can be seen in FIG. 2, the tags 1 are arranged under at theoretical line being substantially parallel with the longitudinal axis of the roof covering in the area close to the butt region 31. Applying the tag 1 in this area has been found beneficial as the roof covering, upon being rolled into rolls and stowed e.g. on pallets, are oriented, due to strength considerations etc., with the butt region 31 facing away from the surface supporting the roll, whereby communicating with the tag is rendered convenient.

Communication with the tag 1 embedded within the roofing product may, following the manufacturing process, be conducted by means of a RFID reader/writer, which may be handheld or not, performing radio communication with the tag 1. As the reader/writer is not forming part of the present invention, the device will not receive further elaboration within this specification.

In the above exposition, the described materials making up the roofing product, is based on bitumen. This may however not in any way be considered as limiting for the scope of the present invention as the roofing products according to the present invention may equally be produced by means of materials like asphalt or rubber. Under manufacturing processes wherein the produced product constitutes a vapour barrier, the materials will of course be chosen accordingly, e.g. metal films or any kind of plastic, such as PE, PVC, EVA or TPE.

The invention claimed is:

1. A method of manufacturing an identifiable roofing product comprising the steps of:
   providing a first layer of material, where the first layer of material comprises a felt or a web impregnated with a material comprising tacky bitumen and heating the first layer of material;
   arranging at least one RFID tag adapted to communicate via radio waves onto the first layer of material by blowing the at least one RFID tag onto said first layer of material by means of a pressurized gas, wherein the at least one RFID tag is applied onto said first layer of material while said first layer of material has a temperature of about 125-150° C.; and
   after the arranging step, providing a second layer of material after the at least one RFID tag is arranged onto the first layer of material, where the combined first and second layer are configured with sufficient flexibility to be rolled into rolls;
   wherein the at least one RFID tag comprises a plurality of RFID tags applied one at a time; and
   wherein the plurality of the at least one RFID tags are applied to said first layer of material in a tab region, close to a butt region, and one by one under a theoretical line being substantially parallel to a longitudinal line of said roofing product.

2. The method of manufacturing the identifiable roofing product according to claim 1, wherein said first layer of material is impregnated with a material comprising bituminous materials by means of a first set of rolls, and said second layer of material comprises bituminous materials applied by means of a coating station and calendered by means of passing through a second set of rolls arranged after the first set of rolls.

3. The method of manufacturing the identifiable roofing product according to claim 2, wherein the at least one RFID tag is applied onto said first layer of material after the first layer of material is impregnated by means of the first set of rolls and before the first layer of material passes through the second set of rolls.

4. The method of manufacturing the identifiable roofing product according to claim 1, wherein the at least one RFID tag is applied by means of a tamp-blow applicator.

5. The method of manufacturing the identifiable roofing product according to claim 1, wherein the at least one RFID tag is, on two large surfaces of the at least one RFID tag, covered with a material having substantially similar thermal coefficient of expansion.

6. The method of manufacturing the identifiable roofing material according to claim 1, wherein the at least one RFID tag is, on at least one of two large surfaces of the at least one RFID tag, provided with an adhesive.

7. The method of manufacturing the identifiable roofing product according to claim 1, wherein the at least one RFID tag is encoded with data prior to being arranged onto said first layer of material.

8. The method of manufacturing the identifiable roofing product according to claim 1, wherein the product comprises a vapor barrier.

9. A method of identifying a roll of roofing product wherein said roofing product comprises a roof covering manufactured according to the method of claim 1, said method further comprising a step of rolling up a length of the identifiable roofing product manufactured according to the method of claim 1.

10. A method of identifying a roof wherein said roof is provided with a part of a roofing product manufactured according to the method of claim 1.

11. A process plant adapted to carry out the method of manufacturing the identifiable roofing product according to the method of claim 1.

12. The method of manufacturing the identifiable roofing product according to claim 4, wherein said tamp blow applicator comprises an applicator head configured for movement towards and away from said first layer of material.

13. The method of manufacturing the identifiable roofing product according to claim 12, wherein a size of a gap between the applicator head and the first layer of material is controlled by means of distance measuring.

14. The method of manufacturing the identifiable roofing product according to claim 12, wherein release of said RFID tag from the applicator head is controlled inter alia by means of monitoring a distance between the applicator head and the first layer of material.

15. The method of manufacturing the identifiable roofing product according to claim 1, wherein the RFID tag is blown onto the first layer of material by means of pressurized dried atmospheric air.

16. The method of manufacturing the identifiable roofing product according to claim 1, further comprising a step of encoding the at least one RFID tag after the at least one RFID tag is arranged onto the first layer of material.

17. An identifiable roofing product manufactured according to the method of claim 1.

* * * * *